United States Patent Office 3,427,732
Patented Feb. 18, 1969

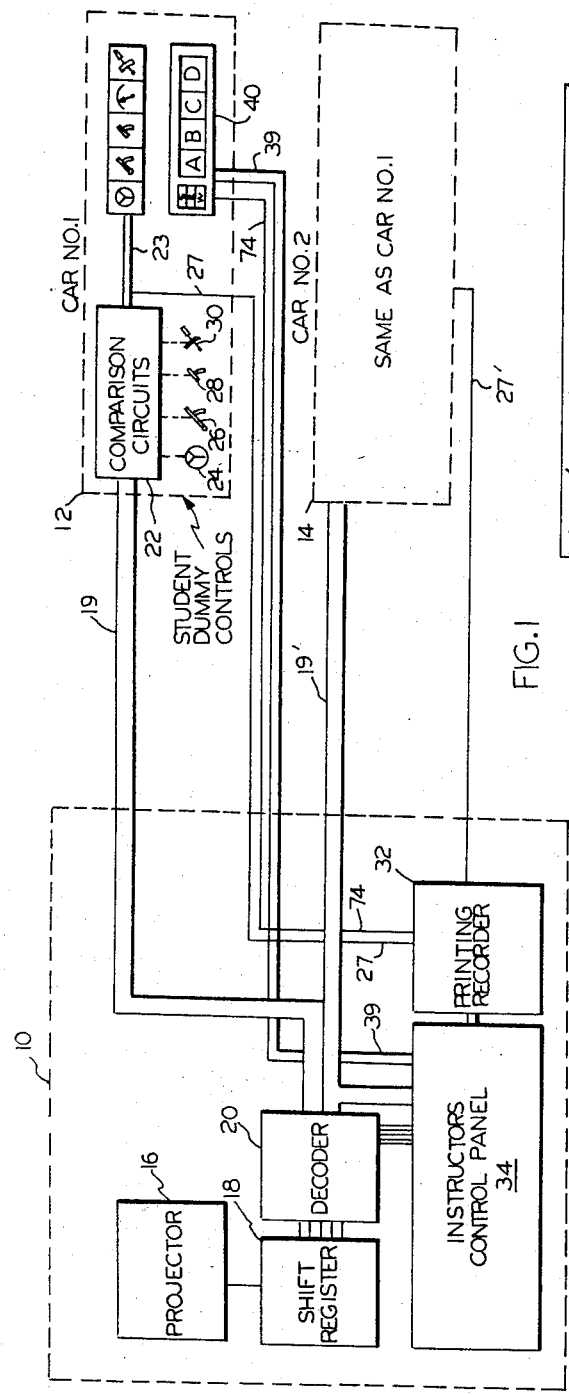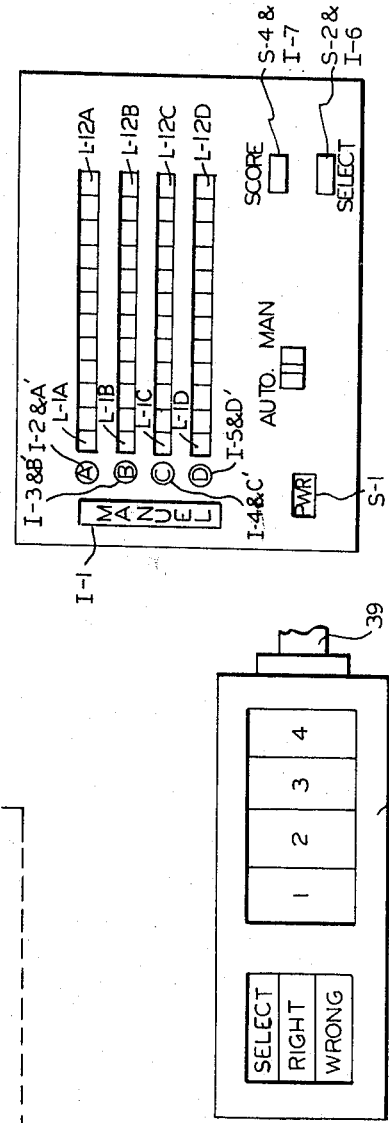

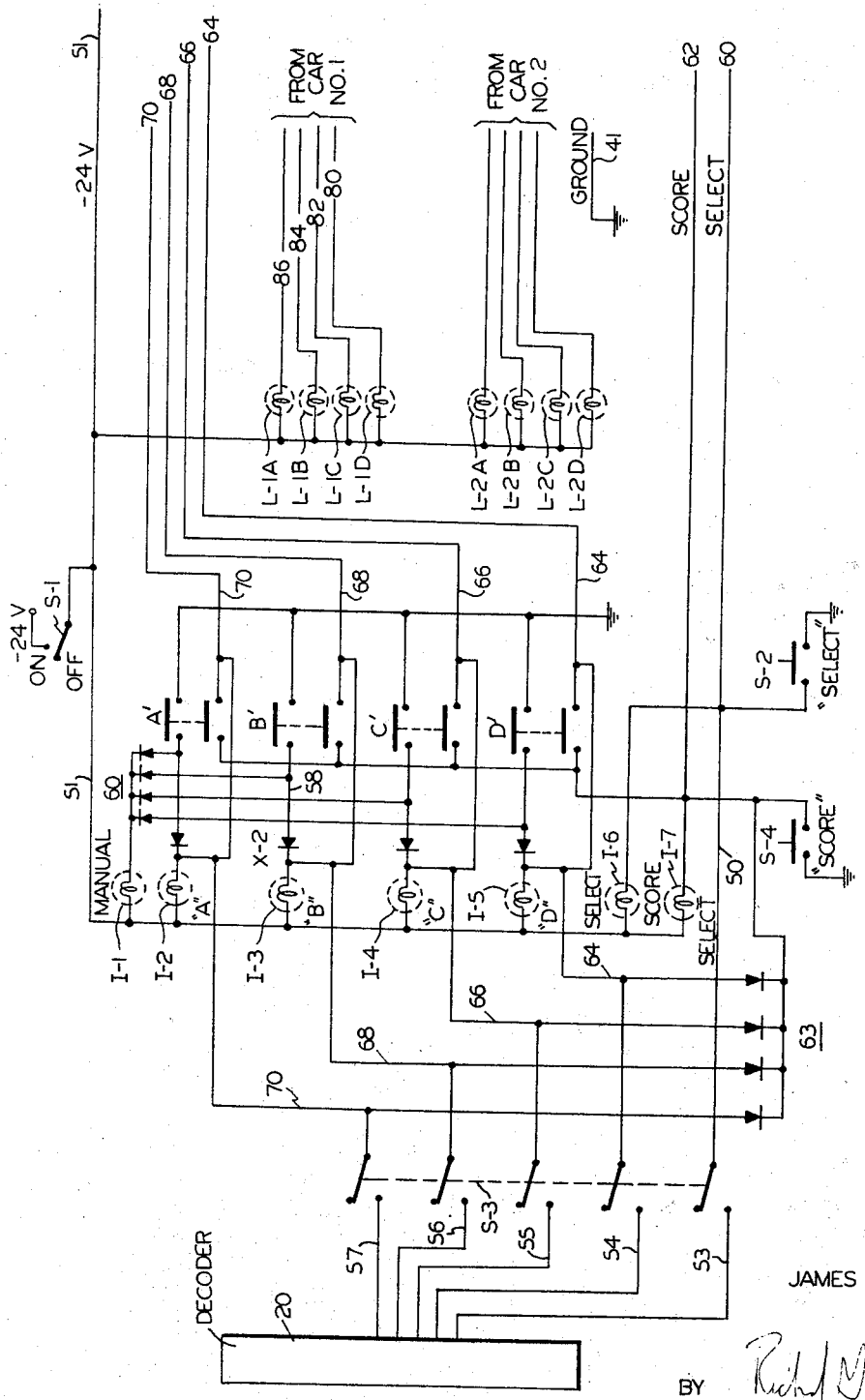
FIG. 2a
INVENTOR
JAMES F. WOPART
BY 
ATTORNEY

3,427,732
EDUCATIONAL TESTING APPARATUS
James F. Wopart, Jr., Binghamton, N.Y., assignor to Singer-General Precision, Inc., a corporation of Delaware
Filed June 13, 1966, Ser. No. 557,069
U.S. Cl. 35—48                                    8 Claims
Int. Cl. G09b 7/06

ABSTRACT OF THE DISCLOSURE

Electrical apparatus for performing educational testing of a group of students by presenting questions having two or more possible answers and allowing the students to indicate their answers by manual operation of switching means associated with a transponder device located at each student station. A corresponding indicating device at the instructor's station shows which switching means was operated, and thus which answer chosen, by each student during the time period allowed for answering. Additional indicating means on the transponder devices are actuated to provide a visual indication to each student of the time period during which the circuits are energized to record the answers. Further novel circuitry is provided to give a still further indication to the student of whether his selected answer was right or wrong.

---

This invention relates to educational testing apparatus, and more particularly, to apparatus which is especially useful in conjunction with classroom driver-training apparatus of the type shown in U.S. applications Ser. No. 337,096 now Patent No. 3,266,173 and 398,218 now Patent No. 3,266,174 by G. H. Sheridan and H. Bechtol et al., respectively, both of which applications are assigned to the assignee of the present application. The prior copending applications illustrate apparatus in which visual displays from a motion picture film are displayed to a classroom of students, each of whom is seated within a dummy automobile driver's station. Signals coded along the film sound track automatically energize testing circuits at selected times in accordance with a desired student control operation. Comparison apparatus compares the instant (or past) operation by each student of his dummy automobile controls with the signals in the testing circuits and provides immediate and visible error indications to those students whose control operation is (or was) incorrect. The occurrence of such errors, and the nature of each test to which a given error pertains, also may be permanently recorded, as shown in the mentioned prior applications. As well as automatic provision of test signals by means coded on the motion picture film, the Bechtol et al. patent shows apparatus which allows an instructor at will to insert any one of a fairly large number of different types of tests into the testing routine, thereby allowing a greater number of tests to be performed, and different tests to be performed at different times, (without requiring a differently-coded film) as the students progress in learning driving skills. While the apparatus of the above-mentioned applications has met with considerable success, it will be noted that all required student responses using such prior apparatus require the operation or non-operation of one or more dummy automobile controls. Most efficient and complete training of students in driver education classes also desirably involves the eliciting of the types of student response, preferably not associated with a particular automobile control device. The instructor, for example, might wish to test each student's knowledge as to whether the shape of a railroad crossing sign is octagonal, round, square or other. It would be theoretically possible to instruct the student to "code" his answer and thereby allow the prior apparatus to register and indicate various further types of student errors. For example, the student could be told, either aurally or by sign on the film screen, to: "Push on the brake if the correct answer is 'octagonal', on the gas if the correct answer is 'round', on the clutch if the correct answer is 'square', or turn the steering wheel if the correct answer is 'other'". Such coding obviously would necessarily often be complicated and unrealistic, and indicated student errors frequently would result from errors in coding rather than in driving knowledge. One object of the present invention is to improve such training apparatus by providing additional means by which students utilizing driver-training equipment of the type mentioned can be tested with multiple-choice questions.

A further object of the invention is to provide apparatus of the type mentioned which will provide a prompt indication to each student as to whether his selected answer was right or wrong.

Another important object of the invention is to provide apparatus of the mentioned type in which a student who initially makes a wrong response is allowed, for a given period of time, after being scored as having committed an error, to change his response until the correct response is selected, and receive an indication when he finally selects the correct answer. A number of recent investigations into the educational concept of "learning through mistakes" indicate that learning is very effectively aided by allowing an initially-erring student to find the correct answer while the problem situation is still fresh and vivid in his mind.

Another object of the invention is to provide indications to the instructor as to which students make errors, and an indication showing approximately what portion of the entire class has responded incorrectly, using simple, inexpensive, and readily-interpreted indicators.

A further object of the invention is to provide such apparatus which may be operated fully automatically, or entirely or in part manually, if desired, so that scoring and indicating circuits for multiple-choice questions may be operated automatically by coding on the film, or manually by the instructor, or in both ways.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

FIG. 1 is a block diagram useful in understanding the overall operation of an exemplary embodiment of the invention.

FIGS. 2a and 2b are electrical schematic diagrams which connect together to illustrate the exemplary embodiment in detail, FIG. 2a showing principally the wiring associated with the instructor's control panel, and FIG. 2b showing principally the wiring associated with the responder portion of each student station.

FIG. 3 is a diagram illustrating one form of which the face of a portion of the instructor's main control panel may take.

FIG. 4 illustrates one exemplary form which the appearance of the face of each student transponder unit may take.

Figure 2B:
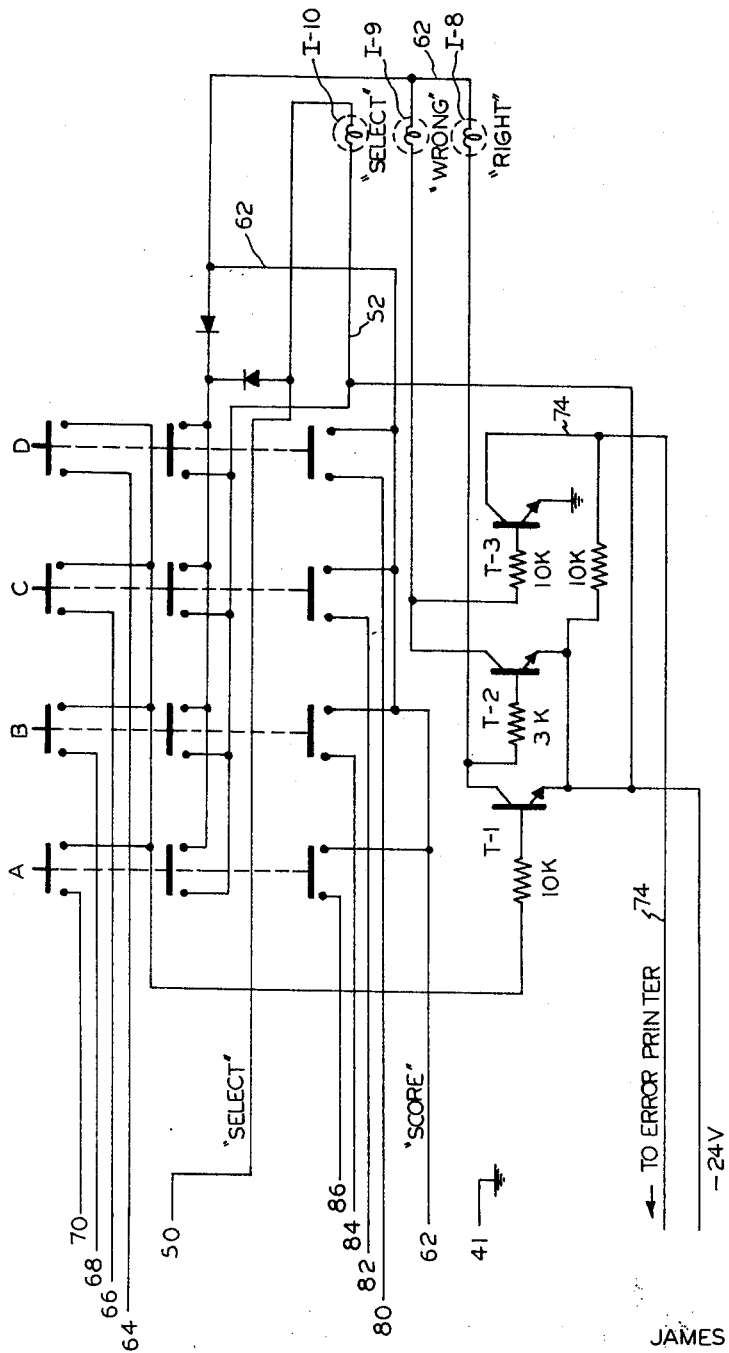

In FIG. 1 block 10 shown in dashed lines represents apparatus which is usually located at a central console or instructor's station, and blocks shown at 12 and 14 represent apparatus located at several student dummy cars. A conventional motion picture projector 16 provides visual displays on a screen (not shown) visible to the students seated in their respective "cars." A slide projector (not shown) is also used sometimes to provide additional visual displays. The motion picture projector 16 provides sequences of visual stimuli on the screen in a classroom, typical sequences being the scenes one views through an automobile windshield as the automobile progresses along a highway. The apparatus also generates test signals in timed relation to the scenes. Signals coded serially along the "sound" track of the motion picture film are fed into a shift register 18 to provide parallel signals, and decoded by decoder 20 to energize selected conductors according to which type of test is being conducted. Five binary digits enable as many as 32 different signals to be encoded along the film. In typical usage only about 20–25 different tests have been used, so that some numbers have remained unused. A separate wire associated with each different test to be made has been routed from the decoder to each student station. If a motion picture scene requires a student to be steering hard to the right at a given time, a given one of the decoder output wires will be energized, thereby energizing one side of a switch provided on each student steering wheel. If a given student is steering hard to the right at the time, the switch on his steering wheel will be open. But if the student has the steering wheel positioned anywhere else than hard to the right, a circuit will be completed through the student's steering wheel switch to energize his "steering error relay." Energization of that relay not only records an error for that student on a chart, together with an indication that it was a steering error, but more importantly, provides an immediate indication to the student, by illumination of a "steering error lamp," that he is committing a steering error.

In FIG. 1 the output signals from decoder 20 are shown connected via cables 19, 19' to what may be termed comparison circuitry in each car, that in car No. 1 being shown at 22. The dummy controls 24, 26, 28, 30 at each student station, and frequently other signals developed by computer circuits (not shown) at the station, are connected to the comparison circuitry 22 to be compared with the signal applied at any time from decoder 20. Upon the occurrence of an error, a signal is routed via cable 23 to an error indicator visible to the student to indicate immediately to the student both the occurrence of an error and the type or class of error he is making, by illumination of a selected lamp. An error signal is also routed back via conductor 27 to operate a recorder 32 of the type shown in the Bechtol et al. patent. Car No. 2, and other cars as desired, are all connected similarly to the central console apparatus at 10. As well as providing automatic testing by means of numbers coded along the film, switching apparatus is provided at the instructor's control panel 34 to allow the instructor at will to insert desired tests into the procedure, so that tests may be provided either manually or automatically. As shown in the Bechtol patent, means may be provided to inhibit one type of test while the other is being provided. Also, as well as being recorded at the central station, the error signals on conductor 27 and its counterpart conductors from the others cars, may be indicated to the instructor by lamps on instructor's control panel 34. As thus far described the apparatus in FIG. 1 is known, and disclosed in detail in the above-mentioned prior applications.

In order to provide the improvements previously alluded to, the instructor's control panel 34 may be provided with the additional apparatus shown in FIG. 2a, and each student station may be equipped with a transponder unit which may take the form shown in FIG. 2b. Each transponder unit connects to central control panel 34 by means of a cable 39 (FIG. 1), which, for the specific apparatus of FIGS. 2a and 2b, comprises twelve conductors, including a common chassis ground connection. The transponder unit for car No. 1 is shown in FIG. 1 at 40. Each transponder unit may take the appearance shown in FIG. 4, and preferably be mounted on the "dashboard" at each student station, in a position relative to the driver and the controls like that which a typical car radio takes in an actual automobile, for example. As best seen in FIG. 2b, each transponder comprises a plurality $n$ (four are shown) of push-button switches identified by the letters A, B, C and D, and three indicating lamps (I–10, I–8 and I–9) which illuminate small plastic signs reading "Select," "Right" and "Wrong," respectively. The push-button switches are the latching type and are interlocked, either mechanically or electrically, by conventional means not shown, so that only one in each group of four can be "operated" or "closed" at a given instant, and so that closure of contacts of one such switch opens the previously-closed contacts of one of the other three switches. Such switch mechanisms have been commonly utilized on "push-button" radio receivers.

The apparatus provided on the instructor's control panel 34 includes, as seen in FIG. 2a, an "On-Off" switch S–1, four push-button switches identified as A', B', C' and D', a "Select" control switch S–2, a "Manual-Automatic" switch S—3, a "Score" control switch S–4, and seven indicating lamps I–1 through I–7. Also, four indicator lamps are provided on panel 34 for each student station, those for Car No. 1 being shown in FIG. 2a at L–1A, L–1B, L–1C and L–1D. These indicator lamps, and the counterpart indicator lamps associated with all of the other student stations preferably are physically arranged as shown in FIG. 3 with all of the A lights for all cars arranged together, preferably in a row, and with all the B, C, and D lights for all cars similarly situated together. The four groups of lights are preferably provided with four differently-colored translucent caps. The four push-button switches A', B', C' and D' are also latching and interlocked in the same manner as the switches (A, B, C, D,) on the transponders. It may be mentioned at this point that more or less than four switches may be used, to provide multiple-choice testing having more or less than four possible choices, with either duplications or savings in circuitry which will become obvious to those skilled in the art.

Many of the switches and lights used in connection with the present invention may advantageously be combined by the use of "push-light" switches, such as the Series 37000 type manufactured by Master Specialties Co., Licon, or Switchcraft Co. Such devices comprise combination switches and lights which indicate the condition to which circuits actuated by the switches have been switched. For example, push-buttons A', B', C' and D' shown in FIG. 2a may advantageously be combined in four push-light switcehs with their associated indicator lights I–2, I–3, I–4 and I–5, and such an arrangement is depicted in FIG. 3.

The provision of a multiple-choice test may be initiated either manually or automatically, as mentioned above. If switch S–3 is positioned as shown in FIG. 2a, so that all of the arms of switch S–3 are open, and the remainder of the apparatus of FIG. 2a disconnected from decoder 20, multiple-choice tests are initiated by momentary closure of control switch S–2 to its "Select" position. Such closure of switch S–2 will be seen to ground conductor 50, thereby illuminating the "Select" indicating light I–6 on the instructor's panel 34 from the negative 24-volt supply conductor 51, and thereby illuminating the "Select" lamp I–10 at each student responder unit, as will be clear from FIG. 2b. If instead the question is to be presented automatically, switch S–3 will be closed, and the coding of an appropriate number on the film strip will cause conductor 53 to be energized (i.e., grounded) at an appropriate time, similarly resulting in illumination of the "Select" lamps on the instructor panel 34 and at each responder unit.

The illumination of the "Select" light I-10 on his transponder is a signal for each student to select a proper answer to the question presented. Each student then will push one of the four interlocked push-button switches A, B, C, D, on his transponder. Simultaneously, the correct answer will be inserted into the apparatus, either automatically by decoder energization (grounding) of one of conductors 54, 55, 56, 57, or manually, by instructor depression of one of his selector switches A', B', C', or D'. If, for example, the correct answer to the question is B, either conductor 56 will be energized by the decoder during automatic operation, or conductor 58 will be grounded by depression of switch B', thereby allowing current to flow through diode X-2 to illuminate the instructor's B lamp, indicator I-3. It may be seen in FIG. 2a that depression by the instructor of a different switch would have illuminated a different respective lamp on the instructor's panel 34, but that depression of any one of the four switches A', B', C' or D' operates through a 4-input OR gate 60 formed by four diodes to illuminate the "Manual" indicator light I-1 on the instructor's panel. It will be noted that instructor selection (or automatic selection) of the correct answer is unnoticeable to the students.

During the "Select" interval all (or most of) the students will operate one of their four switches on their transponder. If a student accidentally pushes the wrong switch, he may correct his action by promptly pushing the right switch, and he will not be penalized if he manages to correct his action during the "Select" interval, or more precisely, prior to the automatic or instructor initiation of a "Score" operation.

After the students have had a reasonable time to select their answers, "Score" conductor 62 will be energized (grounded), either by momentary closure of switch S-4 to the "Score" position, or by automatic application of a ground signal from decoder 20 to line 62 via a 4-line OR gate 63. As will be clear from FIG. 2a, the grounding of conductor 62 grounds one of the four output conductors 64, 66, 68, 70 which lead from the instructor's control panel to each of the student transponder units. During "Manual" operation, the instructor must both select one of his four switches to indicate the correct answer and then move switch S-4 to the "Score" position, while during "Automatic" operation, the signal derived from the film to indicate the correct answer itself provides the "Score" signal, by means of OR gate 63. As shown in FIG. 2b, the four output conductors lead to respective upper wafers on the four switches A, B, C and D of each transponder unit. Suppose, for example, that the correct answer is B, so that the instructor had closed his switch B'. It will be seen that prior closure of switch B' would ground conductor 68 when switch S-2 is later closed to the "Score" position. With conductor 68 grounded, now assume that the student correctly has depressed his switch B. Ground potential will be applied to the base of transistor T-1 via resistor R-1, turning on transistor T-1, and current flowing in the T-1 collector circuit will illuminate the student's "Right" light I-8, indicating a correct answer. Simultaneously, closure of the transponder B switch will connect the ground potential then on "Score" line 62 back to the instructor's control panel via conductor 84, thereby illuminating indicator light L-1B. If the student in Car No. 2 similarly correctly chooses his switch B, he will illuminate the "Right" light I-8 on his transponder, and he will illuminate light L-2B on the instructor's control panel.

Now assume instead that the student incorrectly had depressed his A switch instead of his B switch. Grounded conductor 68 would remain unconnected, and instead, the upper wafer of the student's A switch would apply —24 volts to the T-1 base, so that T-1 would remain cut off or barely turned on. The little or no current flow in the T-1 collector circuit turns transistor T-2 on harder, and transistor T-2 turn-on in turn turns on transistor T-3, which feeds a regenerative signal back to transistor T-2 to turn the latter on even harder. The T-2 collector current flow and T-3 base current flow are seen to be returned through the student's "Wrong" indicator light I-9 to the then-grounded "Score" conductor 62, thereby illuminating the student's "Wrong" light I-9. The change in T-3 collector voltage upon occurrence of a "Wrong" answer provides an output from the student's responder which is connected via conductor 74 to error-printing means 32 located at the central console. As well as causing illumination of the student's "Wrong" light I-9 and the transmission of an error signal to printer 32, the erroneous depression of the transponder A switch will be seen to connect the then-grounded "Score" conductor 62 through conductor 86 to illuminate light L-1A on the instructor panel. The student's erroneous answer will be immediately noticeable to the instructor, for it will cause an indicator to illuminate which is not only a wrong colored light but one also located in the wrong row, as will be seen from FIG. 3. The lighted one of indicators I-2 through I-5 at the left of the panel indicate to the instructor the row in which correct responses appear. By observing the length of the lighted portion of the adjacent row, the instructor will be given an immediate indication, in a form much like a bar graph, of what fraction of the class answered correctly, and simultaneously, clear and readily-interpreted indications of both what erroneous answers other students chose and of how many chose each wrong answer.

If a student initially selects the wrong switch on his responder and has that wrong switch closed when the "Score" period begins, the student's "Wrong" light will be illuminated and an error pulse will be sent to that student's channel on the error printer, as soon as the "Score" period begins. However, while the "Score" period persists, the student then can try to correct his answer by selection of another switch on his transponder, and it will be apparent at this point that throughout the duration of the "Score" period a student can reverse the states of transistors T-1 and T-2, and can extinguish the "Wrong" light and illuminate the "Right" light, by selection of the correct switch on a second (or subsequent) try. Eventual selection of a correct response will not erase the error mark, however, which was previously sent to the printer. With such an arrangement, it will be seen that a student may learn by his mistakes, by having an immediate opportunity to correct them, and to know immediately if his corrections were effective.

Rather than utilizing mechanically latching or electrically interlocked switch sets, it is within the scope of the invention to utilize other selector switch arrangements, such as rotary selector switches, for example, wherein a central selector arm can contact only one at a time of a plural switch contacts arranged at different angular positions.

As will be apparent the cabling shown in FIG. 1 is used solely for ease of illustration, and the various conductors leading between central station 10 and each car may be grouped in other ways in accordance with known practices.

The invention accordingly comprises the features of construction, combinations of elements, and arrangement of parts, which will be exemplified in the constructions hereinafter set forth, and the scope of the invention will be indicated in the claims.

The embodiments of the invention in which an exclusive property or privilege is claimed are defined as follows:

1. Electrical educational testing apparatus of the type in which a plurality of students each may select a desired answer to a question from a plurality of possible answers and manually actuate appropriate circuitry providing an indication at a central instructor's station of the answer selected by each of said students, said apparatus comprising, in combination:
  (a) a transponder device located at each student station;
  (b) a set of individual, manually operable switching means on each of said transponder devices;
  (c) a set of individual first indicator means corresponding to each of said set of switching means at said instructor's station;
  (d) electrical connecting means between said sets of switching means and indicator means constructed and arranged to cause actuation of a discrete one of said indicator means in response to operation of a corresponding one of said switching means when said connecting means are energized;
  (e) means operable to energize said connecting means for distinct time periods; and
  (f) second indicator means associated with each of said student stations and operable in response to operation of said energizing means, thereby providing each student with an indication of the time during which said switching means are operable to actuate said first indicating means.

2. The invention according to claim 1 wherein said means for energizing comprises manually operable additional switching means at said instructor's station, whereby said time periods are directly under the control of the instructor.

3. The invention according to claim 1 wherein said means for energizing are operable automatically in response to coded information associated with the test being given.

4. The invention according to claim 1 wherein said second indicator means comprises a visual indicator on each of said transponder devices having two conditions which may be observed by the students, one of said conditions indicating that said switching means are operable to actuate said first indicating means.

5. The invention according to claim 4 wherein visual indicator comprises an electric light and said two conditions correspond to the on-off condition of said light.

6. The invention according to claim 1 wherein an additional plurality of switching means are provided at said instructor's station and an additional plurality of indicating means are provided at each student's station, said additional switching means being selectively operable by the instructor to cause actuation of said additional indicating means in response to actuation of a selected one of said switching means, thereby indicating to the student whether the proper one of said switching means has been selected.

7. The invention according to claim 6 wherein each of said transponder devices further includes first and second transistors, a power return conductor connecting each of said transponder devices with said instructor's station, a first of said additional plurality of indicating means being connected in series with the collector-emitter circuit of said first transistor between a further conductor connecting said second indicating means and said energizing means and said power return conductor, a second of said additional plurality of indicating means being connected in series with the collector-emitter circuit of said second transistor between said further conductor and said power return conductor, and circuit means connecting said switching means to control said first and second transistors.

8. Apparatus according to claim 7 in which said second transistor is connected to be controlled by said first transistor, and in which said first transistor is connected to be controlled by said switching means of the transponder device.

References Cited

UNITED STATES PATENTS

| | | | |
|---|---|---|---|
| 3,141,243 | 7/1964 | Chapman et al. | 35—9 |
| 3,190,014 | 6/1965 | Rhodes | 35—48 |
| 3,199,230 | 8/1965 | Sylvester et al. | 35—9 |
| 3,300,876 | 1/1967 | Johannsen | 35—9 |

FOREIGN PATENTS

| | | |
|---|---|---|
| 1,175,578 | 8/1964 | Germany. |

EUGENE R. CAPOZIO, *Primary Examiner.*

WALTER W. NIELSEN, *Assistant Examiner.*

U.S. Cl. X.R.

35—11